(12) United States Patent
Fujita et al.

(10) Patent No.: US 9,649,880 B2
(45) Date of Patent: May 16, 2017

(54) BICYCLE HUB ASSEMBLY

(71) Applicant: SHIMANO INC., Sakai (JP)

(72) Inventors: Hiroshi Fujita, Sakai (JP); Naohiro Nishimoto, Sakai (JP)

(73) Assignee: SHIMANO INC., Sakai (JP)

(*) Notice: Subject to any disclaimer, the term of this patent is extended or adjusted under 35 U.S.C. 154(b) by 161 days.

(21) Appl. No.: 14/609,338

(22) Filed: Jan. 29, 2015

(65) Prior Publication Data

US 2016/0223033 A1 Aug. 4, 2016

(51) Int. Cl.
| | | |
|---|---|---|
| *F16D 11/00* | (2006.01) | |
| *B60B 27/04* | (2006.01) | |
| *B60B 27/00* | (2006.01) | |
| *B60B 27/02* | (2006.01) | |
| *F16H 1/00* | (2006.01) | |
| *F16D 41/36* | (2006.01) | |

(52) U.S. Cl.
CPC ........ *B60B 27/047* (2013.01); *B60B 27/0026* (2013.01); *B60B 27/023* (2013.01); *F16D 41/36* (2013.01); *F16H 1/00* (2013.01); *B60Y 2200/13* (2013.01)

(58) Field of Classification Search
CPC . B60B 27/047; B60B 27/0026; B60B 27/023; F16D 41/36; F16D 1/00; B60Y 2200/13
See application file for complete search history.

(56) References Cited

U.S. PATENT DOCUMENTS

| | | | |
|---|---|---|---|
| 4,593,799 A * | 6/1986 | Ozaki | F16D 41/36 |
| | | | 192/46 |
| 5,964,332 A | 10/1999 | King | |
| 6,123,179 A | 9/2000 | Chen | |
| 6,386,566 B1 * | 5/2002 | Freeberg | B62K 9/02 |
| | | | 188/24.17 |
| 6,478,128 B2 | 11/2002 | Taylor | |
| 6,588,564 B1 | 7/2003 | Jager et al. | |
| 8,096,623 B2 | 1/2012 | You | |
| 8,371,660 B2 | 2/2013 | Shook | |
| 2008/0315679 A1 | 12/2008 | Shook | |
| 2011/0175433 A1 | 7/2011 | Chiang | |
| 2011/0193406 A1 | 8/2011 | Chiang | |
| 2012/0032498 A1 | 2/2012 | Klieber | |
| 2013/0076112 A1 | 3/2013 | Tho | |
| 2013/0088075 A1 | 4/2013 | Spahr et al. | |

* cited by examiner

*Primary Examiner* — David J Hlavka
(74) *Attorney, Agent, or Firm* — Mori & Ward, LLP

(57) ABSTRACT

A bicycle hub assembly comprises a hub axle, a hub shell, a sprocket support body, a first ratchet member, a second ratchet member, and a holding member. The sprocket support body includes a first helical spline. The first ratchet member includes at least one first ratchet tooth, and a second helical spline configured to mate with the first helical spline. The second ratchet member includes at least one second ratchet tooth configured to mate with the at least one first ratchet tooth, and a hub shell engagement portion configured to engage with the hub shell. The holding member is configured to hold an assembled state where the sprocket support body. The first ratchet member and the second ratchet member are assembled as a single unit.

18 Claims, 19 Drawing Sheets

BICYCLE HUB ASSEMBLY

BACKGROUND OF THE INVENTION

Field of the Invention

The present invention relates to a bicycle hub assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle hub assembly.

SUMMARY OF THE INVENTION

In accordance with a first aspect of the present invention, a bicycle hub assembly comprises a hub axle, a hub shell, a sprocket support body, a first ratchet member, a second ratchet member, and a holding member. The hub axle defines a rotational axis. The hub shell is rotatably mounted on the hub axle to rotate about the rotational axis. The sprocket support body is rotatably mounted on the hub axle to rotate about the rotational axis. The sprocket support body includes a first helical spline. The first ratchet member includes at least one first ratchet tooth, and a second helical spline configured to mate with the first helical spline. The second ratchet member includes at least one second ratchet tooth configured to mate with the at least one first ratchet tooth, and a hub shell engagement portion configured to engage with the hub shell. The holding member is configured to hold an assembled state where the sprocket support body. The first ratchet member and the second ratchet member are assembled as a single unit.

In accordance with a second aspect of the present invention, the bicycle hub assembly according to the first aspect is configured so that the holding member is attached to the sprocket support body to hold the assembled state.

In accordance with a third aspect of the present invention, the bicycle hub assembly according to the first aspect is configured so that the holding member is attached to the sprocket support body to prevent the first ratchet member from being removed from the sprocket support body.

In accordance with a fourth aspect of the present invention, the bicycle hub assembly according to the first aspect is configured so that the holding member includes a restricting part configured to restrict an axial movement of the first ratchet member relative to the sprocket support body in an attachment state where the holding member is attached to the sprocket support body.

In accordance with a fifth aspect of the present invention, the bicycle hub assembly according to the fourth aspect is configured so that the holding member includes an attachment part configured to be attached to the sprocket support body. The restricting part extends outward from the attachment part in a radial direction of the bicycle hub assembly.

In accordance with a sixth aspect of the present invention, the bicycle hub assembly according to the fifth aspect is configured so that the attachment part has an annular shape. The restricting part extends outward from an outer periphery of the attachment part in the radial direction.

In accordance with a seventh aspect of the present invention, the bicycle hub assembly according to the fifth aspect is configured so that the sprocket support body includes an annular part. The first helical spline is provided on an outer periphery of the annular part. The attachment part is configured to be attached to the annular part of the sprocket support body.

In accordance with an eighth aspect of the present invention, the bicycle hub assembly according to the seventh aspect is configured so that the attachment part is configured to be attached to an end of the annular part.

In accordance with a ninth aspect of the present invention, the bicycle hub assembly according to the seventh aspect is configured so that the sprocket support body includes an attachment groove provided on an axial end surface of the annular part. The restricting part is at least partially provided in the attachment groove in an attachment state where the holding member is attached to the sprocket support body.

In accordance with a tenth aspect of the present invention, the bicycle hub assembly according to the ninth aspect is configured so that the holding member is disposed at an axial position where the holding member does not protrude from the axial end surface of the annular part in the attachment state.

In accordance with an eleventh aspect of the present invention, the bicycle hub assembly according to the ninth aspect is configured so that the attachment groove extends in the radial direction.

In accordance with a twelfth aspect of the present invention, the bicycle hub assembly according to the fourth aspect is configured so that the restricting part is contactable with the first ratchet member to restrict the axial movement of the first ratchet member relative to the sprocket support body in the attachment state.

In accordance with a thirteenth aspect of the present invention, the bicycle hub assembly according to the fourth aspect is configured so that the second helical spline includes second spline teeth. The restricting part is contactable with at least one of the second spline teeth to restrict an axial movement of the first ratchet member relative to the sprocket support body in the attachment state where the holding member is attached to the sprocket support body.

In accordance with a fourteenth aspect of the present invention, the bicycle hub assembly according to the fourth aspect is configured so that the first helical spline includes first spline teeth, and first spline grooves defined between adjacent two teeth of the first spline teeth. The restricting part is provided at an axial end of at least one of the first spline grooves.

In accordance with a fifteenth aspect of the present invention, the bicycle hub assembly according to the first aspect further comprises a cover member and an additional holding member. The cover member is configured to cover an annular gap between the sprocket support body and the hub shell. The additional holding member is configured to be detachably attached to the hub shell to hold a cover state where the cover member covers the annular gap.

In accordance with aسixteenth aspect of the present invention, the bicycle hub assembly according to the fifteenth aspect is configured so that the additional holding member includes a first member elastically deformable so that an outer diameter of the first member changes.

In accordance with a seventeenth aspect of the present invention, the bicycle hub assembly according to the sixteenth aspect is configured so that the first member has a substantially annular shape and includes a first end, and a second end circumferentially opposite to the first end with a gap between the first end and the second end.

In accordance with an eighteenth aspect of the present invention, the bicycle hub assembly according to the seventeenth aspect is configured so that the additional holding member includes a second member including an annular groove in which the first member is provided.

In accordance with a nineteenth aspect of the present invention, a bicycle hub assembly comprises a hub axle, a hub shell, and a sprocket support body. The hub axle defines a rotational axis. The hub shell is rotatably mounted on the hub axle to rotate about the rotational axis. The sprocket support body is rotatably mounted on the hub axle to rotate about the rotational axis and includes a tubular part, a first sprocket engaging tooth, and a second sprocket engaging tooth. The tubular part includes an outer peripheral surface and an attachment portion provided only radially inward of the outer peripheral surface. The first sprocket engaging tooth is configured to be attached to the attachment portion of the tubular part. The first sprocket engaging tooth includes a first radially outer surface radially facing and provided radially outward of the outer peripheral surface. The second sprocket engaging tooth is provided on the outer peripheral surface. The second sprocket engaging tooth includes a second radially outer surface radially facing and provided radially outward of the outer peripheral surface. The third radially outer surface radially faces and is provided radially outward of the outer peripheral surface and radially inward of the second radially outer surface. A first distance being defined from the outer peripheral surface to the first radially outer surface, a second distance being defined from the outer peripheral surface to the third radially outer surface, the second distance being shorter than the first distance.

In accordance with a twentieth aspect of the present invention, the bicycle hub assembly according to the nineteenth aspect is configured so that the sprocket support body includes a flange part extending radially outward from the outer peripheral surface of the tubular part. The second sprocket engaging tooth includes a first axial end and a second axial end opposite to the first axial end. The first axial end is closer to the flange part than the second axial end. The second radially outer surface is provided closer to the first axial end than the second axial end. The third radially outer surface is provided closer to the second axial end than the first axial end.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
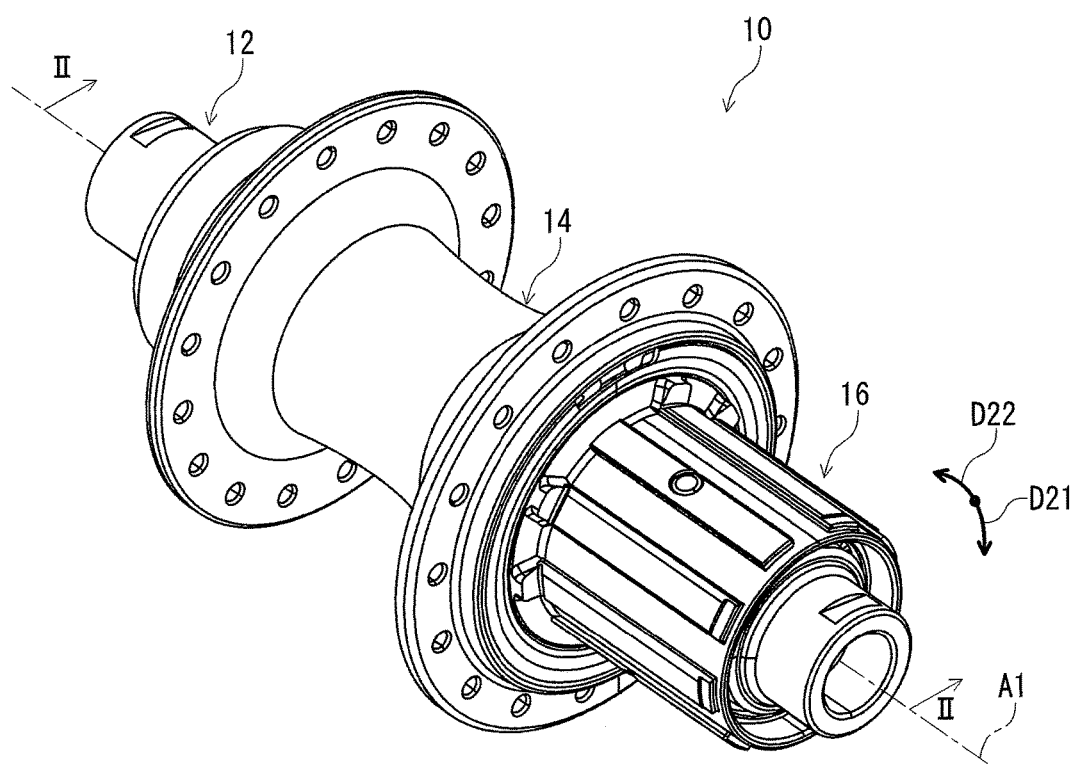
FIG. 1 is a perspective view of a bicycle hub assembly in accordance with a first embodiment.

The embodiments will now be described with reference to the accompanying drawings, wherein like reference numerals designate corresponding or identical elements throughout the various drawings.

Referring initially to FIG. 1, a bicycle hub assembly 10 in accordance with an embodiment is illustrated. While the bicycle hub assembly 10 is a rear hub assembly in the illustrated embodiment, the construction of the bicycle hub assembly 10 can be applied to a front hub assembly if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar. Accordingly, these terms, as utilized to describe the bicycle hub assembly 10, should be interpreted relative to the bicycle equipped with the bicycle hub assembly 10 as used in an upright riding position on a horizontal surface.

As seen in FIG. 1, the bicycle hub assembly 10 comprises a hub axle 12, a hub shell 14, and a sprocket support body 16. The hub axle 12 defines a rotational axis A1. The hub axle 12 is secured to a bicycle frame (not shown) via a wheel securing assembly (not shown). The hub shell 14 is rotatably mounted on the hub axle 12 to rotate about the rotational axis A1. The sprocket support body 16 is rotatably mounted on the hub axle 12 to rotate about the rotational axis A1.

Figure 2:
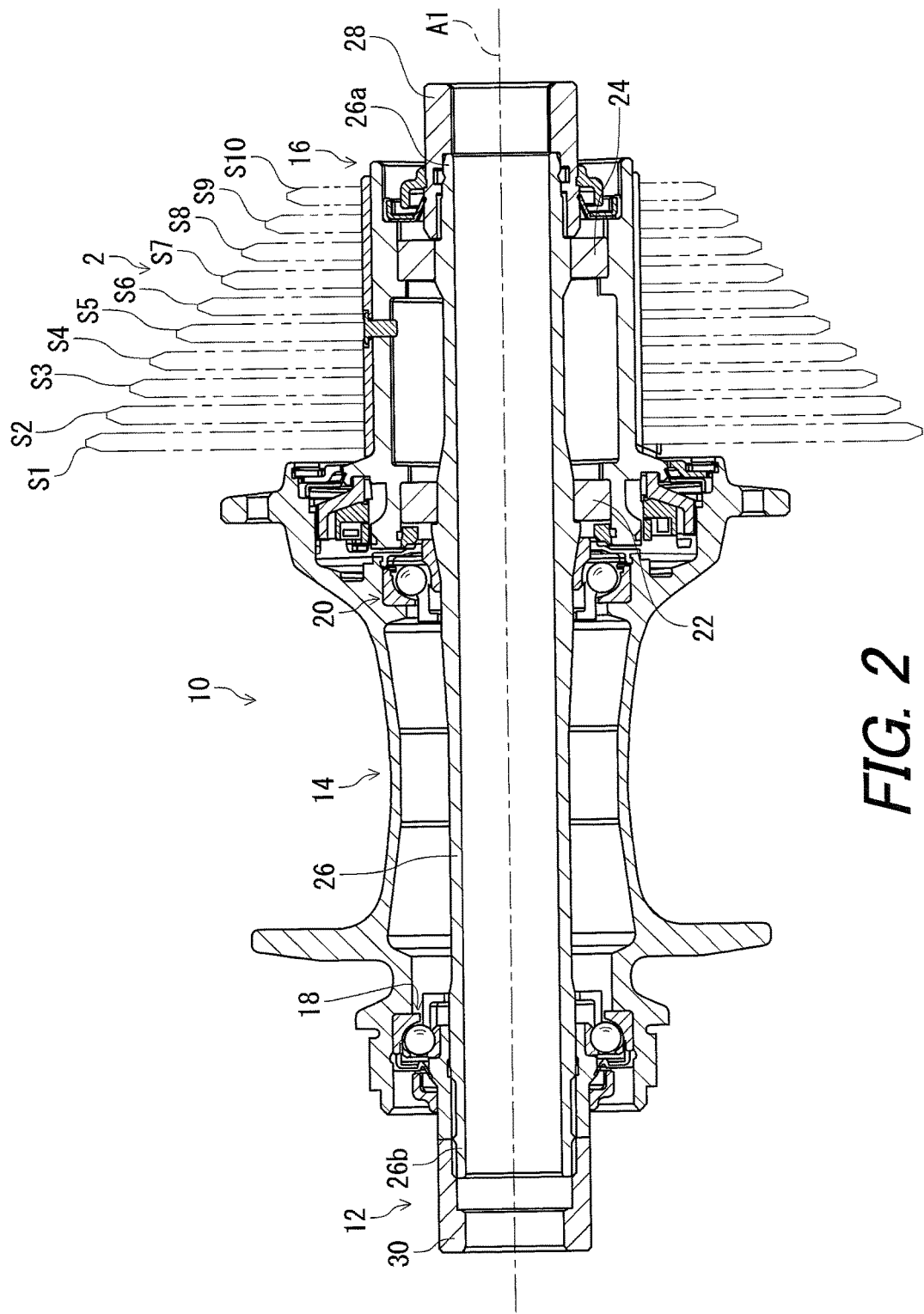
FIG. 2 is a cross-sectional view of the bicycle hub assembly taken along line II-II of FIG. 1.

As seen in FIG. 2, the sprocket support body 16 is configured to support a sprocket assembly 2 including sprockets S1 to S10. The sprocket support body 16 is configured to receive a rotational force from the sprocket assembly 2 during pedaling. The bicycle hub assembly 10 comprises a first bearing assembly 18 and a second bearing assembly 20. The first bearing assembly 18 and the second bearing assembly 20 are provided between the hub axle 12 and the hub shell 14 to rotatably support the hub shell 14 relative to the hub axle 12 about the rotational axis A1.

The bicycle hub assembly 10 comprises a first support member 22 and a second support member 24. The first support member 22 and the second support member 24 are provided between the hub axle 12 and the sprocket support body 16 to rotatably support the sprocket support body 16 relative to the hub axle 12 about the rotational axis A1. Each of the first support member 22 and the second support member 24 has an annular shape. For example, the first support member 22 and the second support member 24 are secured to the sprocket support body 16. The first support member 22 and the second support member 24 are in slidable contact with an outer peripheral surface of the hub axle 12. At least one of the first support member 22 and the second support member 24 can be the same construction as those of the first bearing assembly 18 and the second bearing assembly 20 if needed and/or desired.

The hub axle 12 includes an axle body 26, a first end cap 28, and a second end cap 30. The axle body 26 has a tubular shape and extends along the rotational axis A1. The first end cap 28 is screwed on a first threaded end 26a of the axle body 26. The second end cap 30 is screwed on a second threaded end 26b of the axle body 26. The first end cap 28 is detached from the axle body 26 when the sprocket support body 16 is detached from the hub axle 12.

Figure 3:
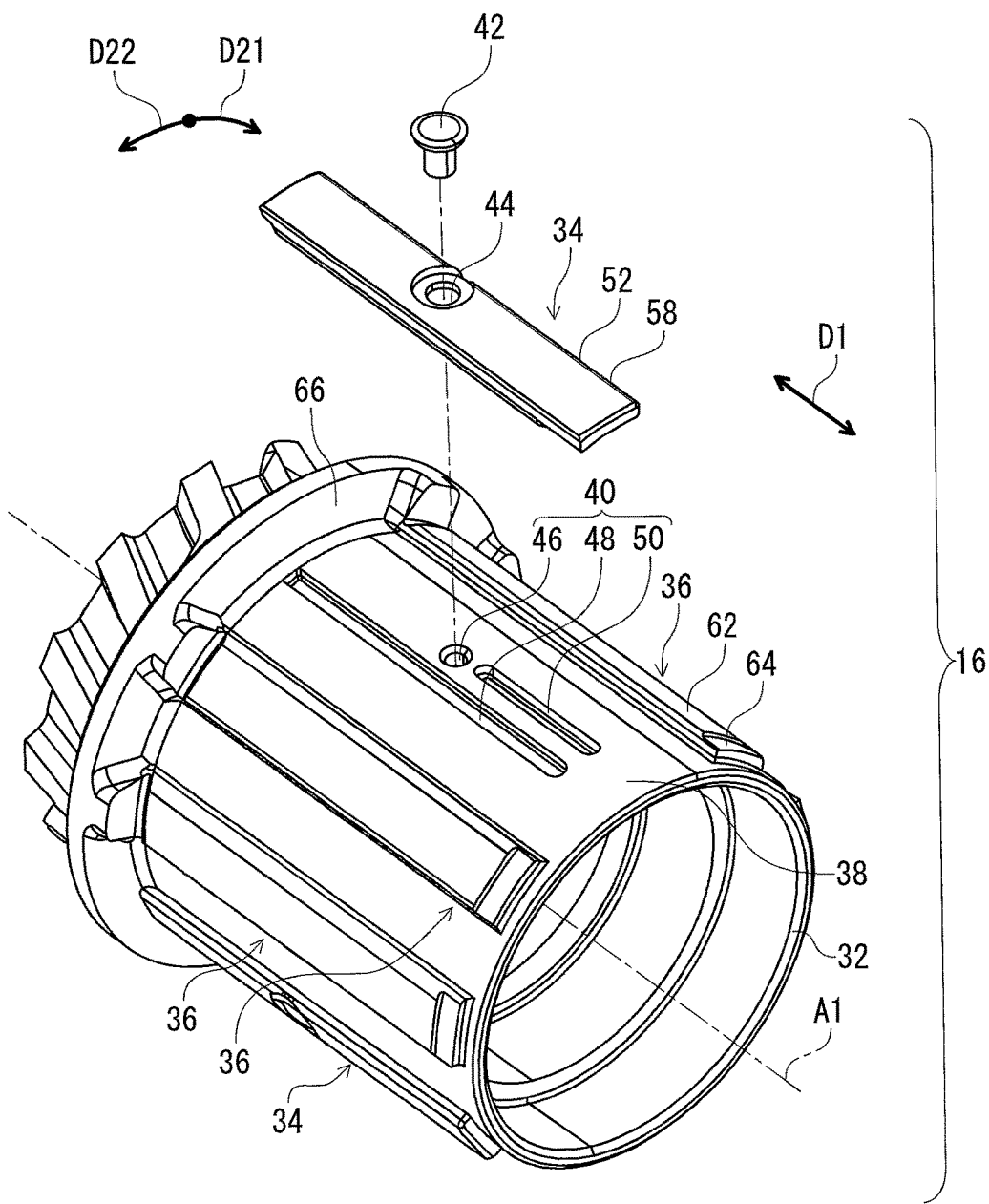
FIG. 3 is an exploded perspective view of a sprocket support body of the bicycle hub assembly illustrated in FIG. 1.
Figure 4:
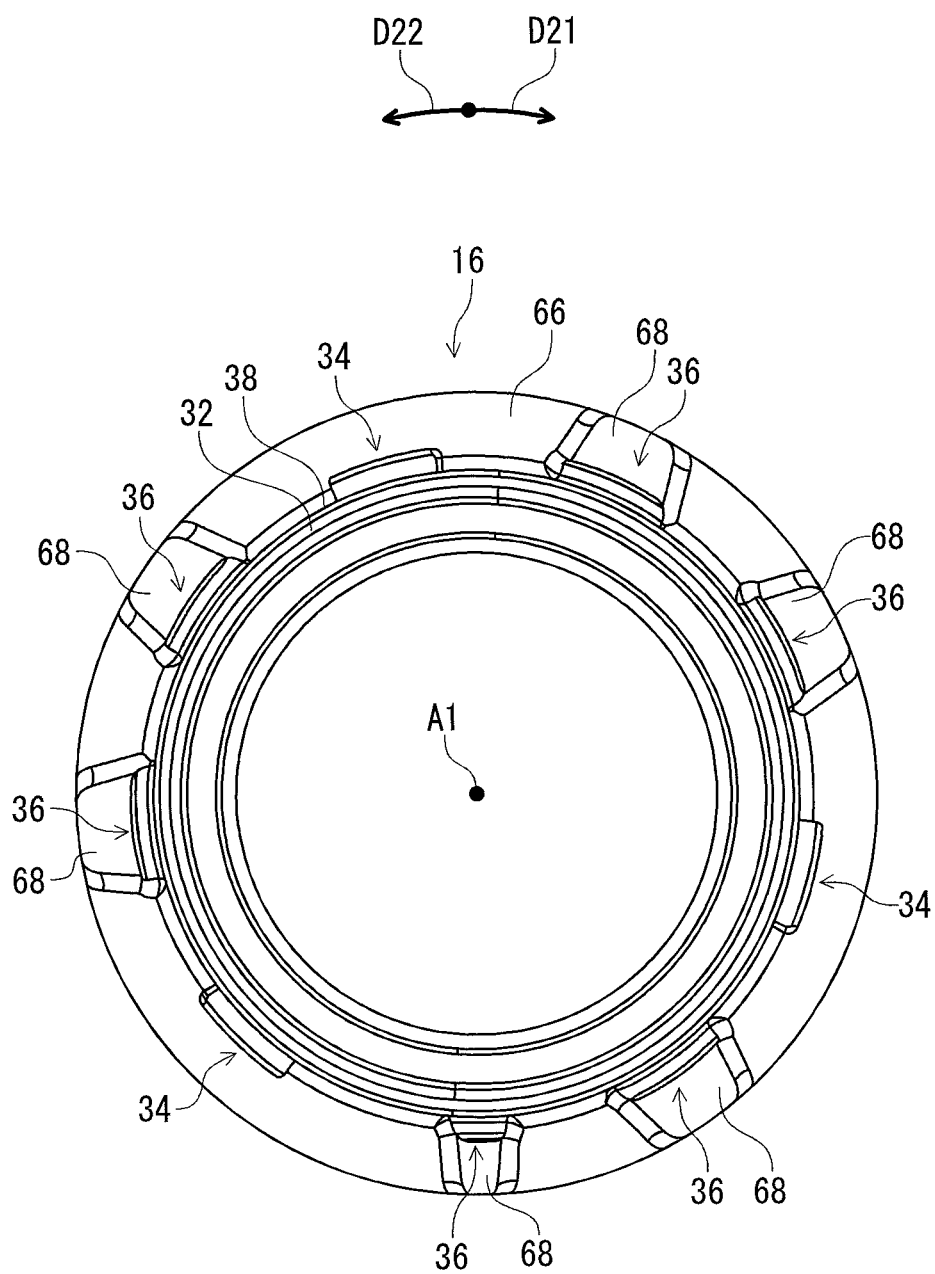
FIG. 4 is a right side elevational view of the sprocket support body illustrated in FIG. 3.

As seen in FIGS. 3 and 4, the sprocket support body 16 includes a tubular part 32, a first sprocket engaging tooth 34, and a second sprocket engaging tooth 36. The tubular part 32 includes an outer peripheral surface 38 and an attachment portion 40 provided only radially inward of the outer peripheral surface 38. The first sprocket engaging tooth 34 is configured to be attached to the attachment portion 40 of the tubular part 32. The second sprocket engaging tooth 36 is provided on the outer peripheral surface 38.

In the illustrated embodiment, as seen in FIG. 4, the tubular part 32 includes a plurality of attachment portions 40 provided only radially inward of the outer peripheral surface 38. The sprocket support body 16 includes a plurality of first sprocket engaging teeth 34 and a plurality of second sprocket engaging teeth 36. Arrangement of the first and second sprocket engaging teeth 34 and 36 are not limited to the illustrated embodiment. A total number of the first sprocket engaging teeth 34 is not limited to the illustrated embodiment. A total number of the second sprocket engaging teeth 36 is not limited to the illustrated embodiment.

As seen in FIG. 3, the first sprocket engaging tooth 34 is a separate member from the tubular part 32. The second sprocket engaging tooth 36 is integrally provided with the tubular part 32 as a single unitary member. The first sprocket engaging teeth 34 are configured to be respectively attached to the attachment portions 40. The first sprocket engaging teeth 34 are provided on the outer peripheral surface 38. The second sprocket engaging teeth 36 are provided on the outer peripheral surface 38.

As seen in FIG. 3, the bicycle hub assembly 10 includes fasteners 42 such as screws. The first sprocket engaging tooth 34 is attached to the tubular part 32 via the fastener 42. The first sprocket engaging tooth 34 includes a through-hole 44. The attachment portion 40 includes an attachment hole 46 such as a threaded hole. The fastener 42 extends through the through-hole 44 and is screwed in the attachment hole 46.

The attachment portion 40 includes a first attachment groove 48 and a second attachment groove 50. The first attachment groove 48 extends in an axial direction D1 parallel to the rotational axis A1. The second attachment groove 50 extends in the axial direction D1. While the first attachment groove 48 has a length longer than a length of the second attachment groove 50 in the illustrated embodiment, the length of the first attachment groove 48 can be equal to or shorter than the length of the second attachment groove 50 if needed and/or desired. At least one of the first attachment groove 48 and the second attachment groove 50 can be omitted from the attachment portion 40 if needed and/or desired.

The first sprocket engaging tooth 34 includes a tooth body 52. The tooth body 52 extends in the axial direction D1. The tooth body 52 has an arc shape along the outer peripheral surface 38 of the tubular part 32 when viewed from the axial direction D1.

Figure 5:
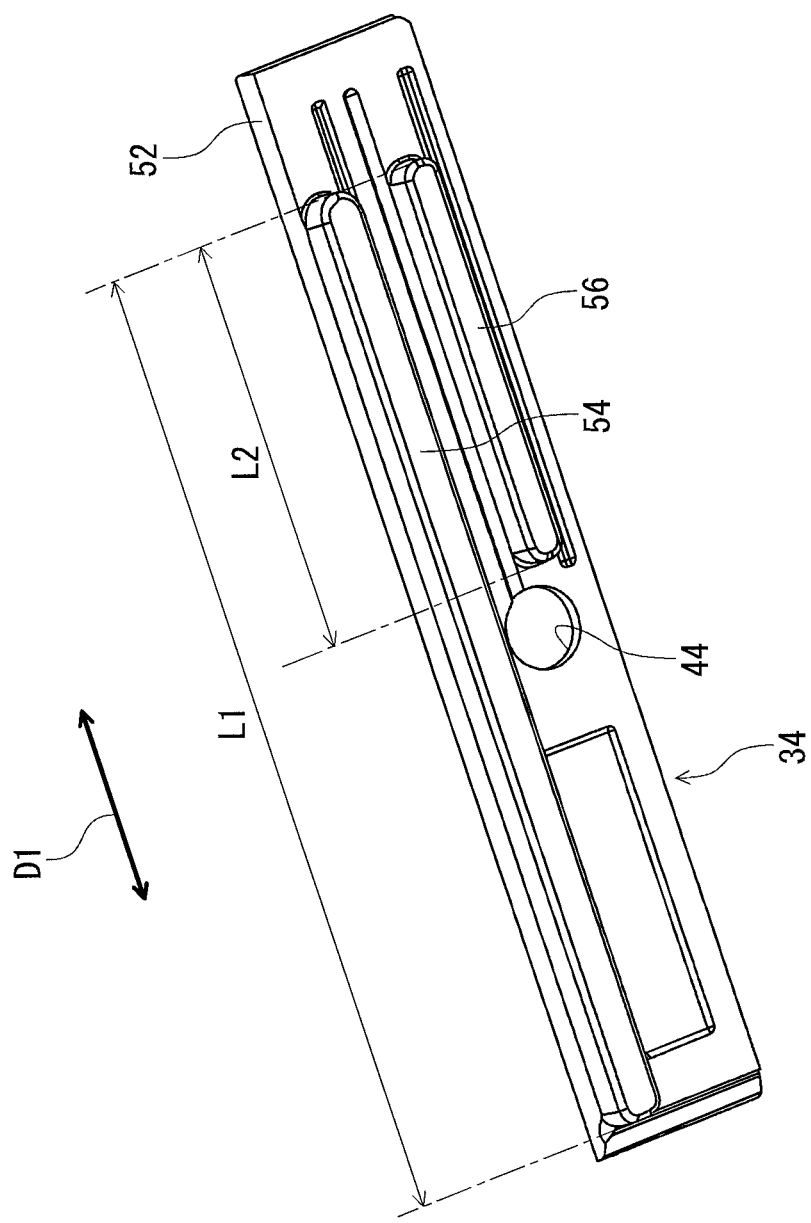
FIG. 5 is a perspective view of a sprocket engaging tooth of the sprocket support body illustrated in FIG. 3.

As seen in FIG. 5, the first sprocket engaging tooth 34 includes a first protrusion 54 and a second protrusion 56. The first protrusion 54 protrudes from the tooth body 52 and extends in the axial direction D1. The second protrusion 56 protrudes from the tooth body 52 and extends in the axial direction D1.

In the illustrated embodiment, the first protrusion 54 has a first length L1 defined in the axial direction D1. The second protrusion 56 has a second length L2 defined in the axial direction D1. In the illustrated embodiment, the first length L1 is different from the second length L2. The first length L1 is longer than the second length L2. However, the first length L1 can be equal to or shorter than the second length L2 if needed and/or desired. At least one of the first protrusion 54 and the second protrusion 56 can be omitted from the first sprocket engaging tooth 34 if needed and/or desired.

Figure 6:
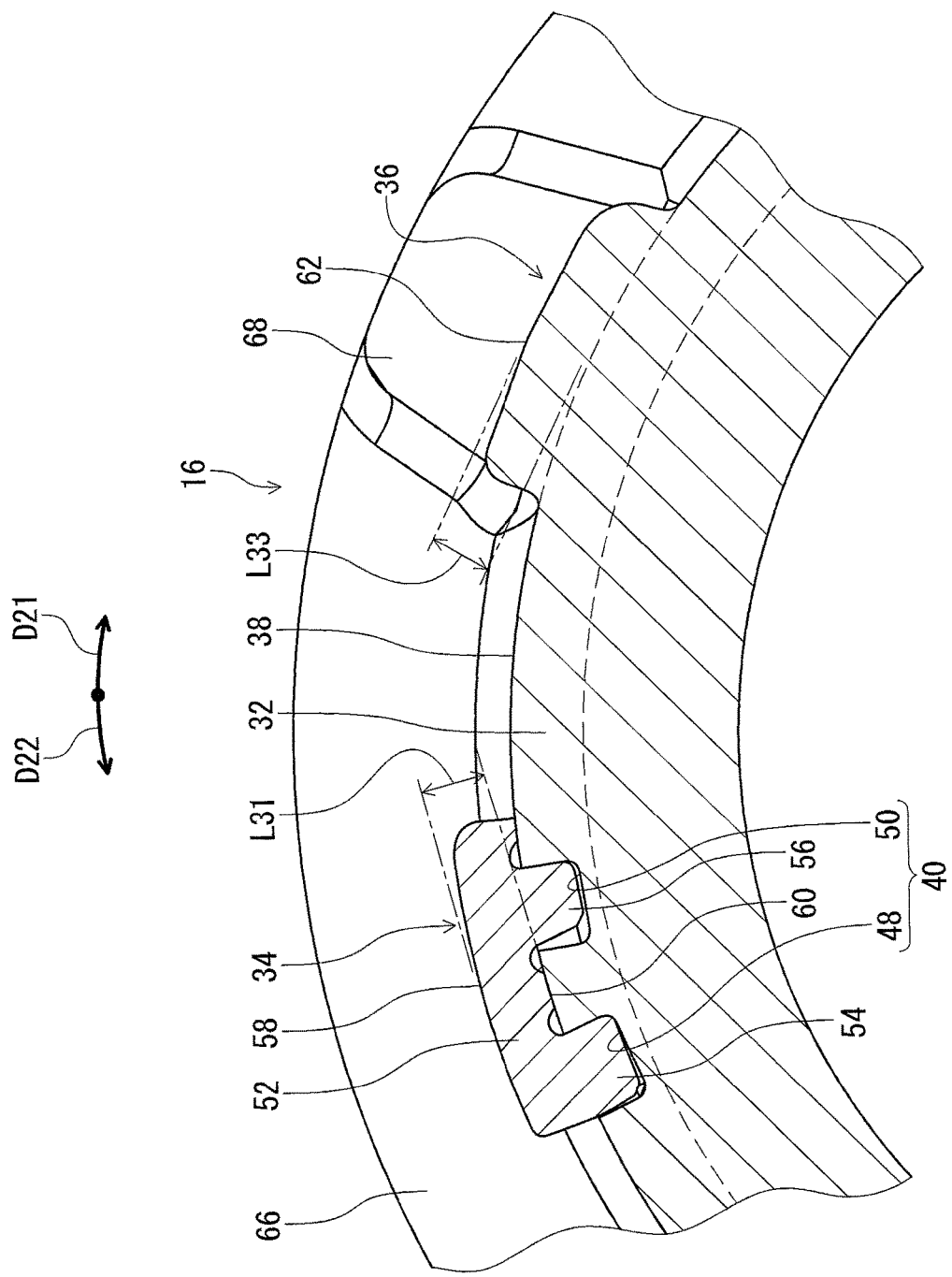
FIG. 6 is a cross-sectional view of the sprocket support body taken along line VI-VI of FIG. 8.

As seen in FIG. 6, the first protrusion 54 is provided in the first attachment groove 48 in a state where the first sprocket engaging tooth 34 is attached to the tubular part 32. The second protrusion 56 is provided in the second attachment groove 50 in the state where the first sprocket engaging tooth 34 is attached to the tubular part 32.

As seen in FIGS. 3 and 6, the first sprocket engaging tooth 34 includes a first radially outer surface 58. The first radially outer surface 58 radially faces. As seen in FIG. 6, the first radially outer surface 58 is provided radially outward of the outer peripheral surface 38. The first sprocket engaging tooth 34 includes a first radially inner surface 60 opposite to the first radially outer surface 58. The first protrusion 54 and the second protrusion 56 protrude from the first radially inner surface 60. The first radially inner surface 60 is in contact with the outer peripheral surface 38 of the tubular part 32 in the state where the first sprocket engaging tooth 34 is attached to the attachment portion 40 of the tubular part 32.

As seen in FIGS. 3 and 6, the second sprocket engaging tooth 36 includes a second radially outer surface 62. The second radially outer surface 62 radially faces. As seen in FIG. 6, the second radially outer surface 62 is provided radially outward of the outer peripheral surface 38.

Figure 7:
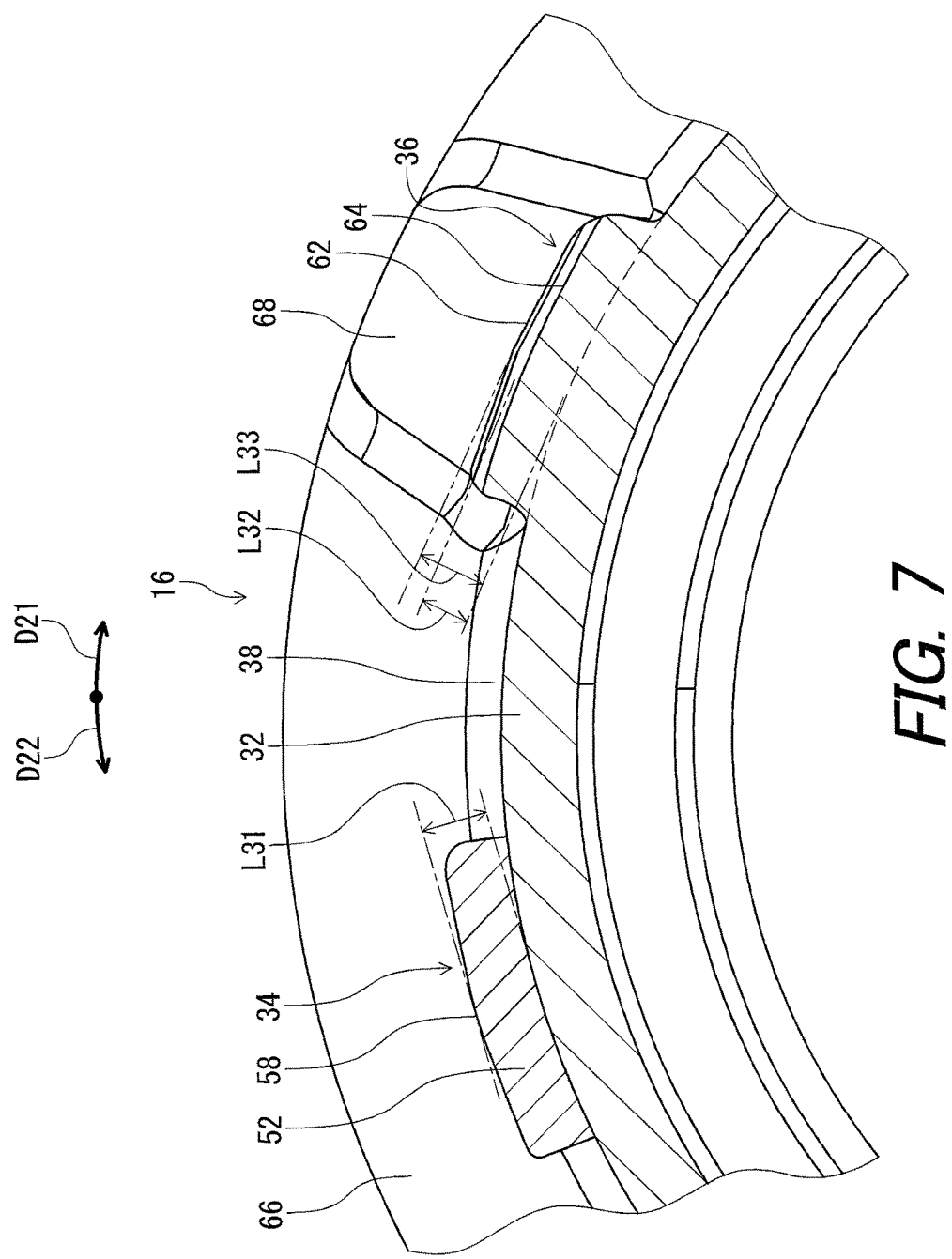
FIG. 7 is a cross-sectional view of the sprocket support body taken along line VII-VII of FIG. 8.

As seen in FIGS. 3 and 7, the second sprocket engaging tooth 36 includes a third radially outer surface 64. The third radially outer surface 64 radially faces. As seen in FIG. 7, the third radially outer surface 64 is provided radially outward of the outer peripheral surface 38 and radially inward of the second radially outer surface 62. A first distance L31 is defined from the outer peripheral surface 38 to the first radially outer surface 58. A second distance L32 is defined from the outer peripheral surface 38 to the third radially outer surface 64. The second distance L32 is shorter than the first distance L31. A third distance L33 is defined from the outer peripheral surface 38 to the second radially outer surface 62. The second distance L32 is shorter than the third distance L33.

Figure 8:
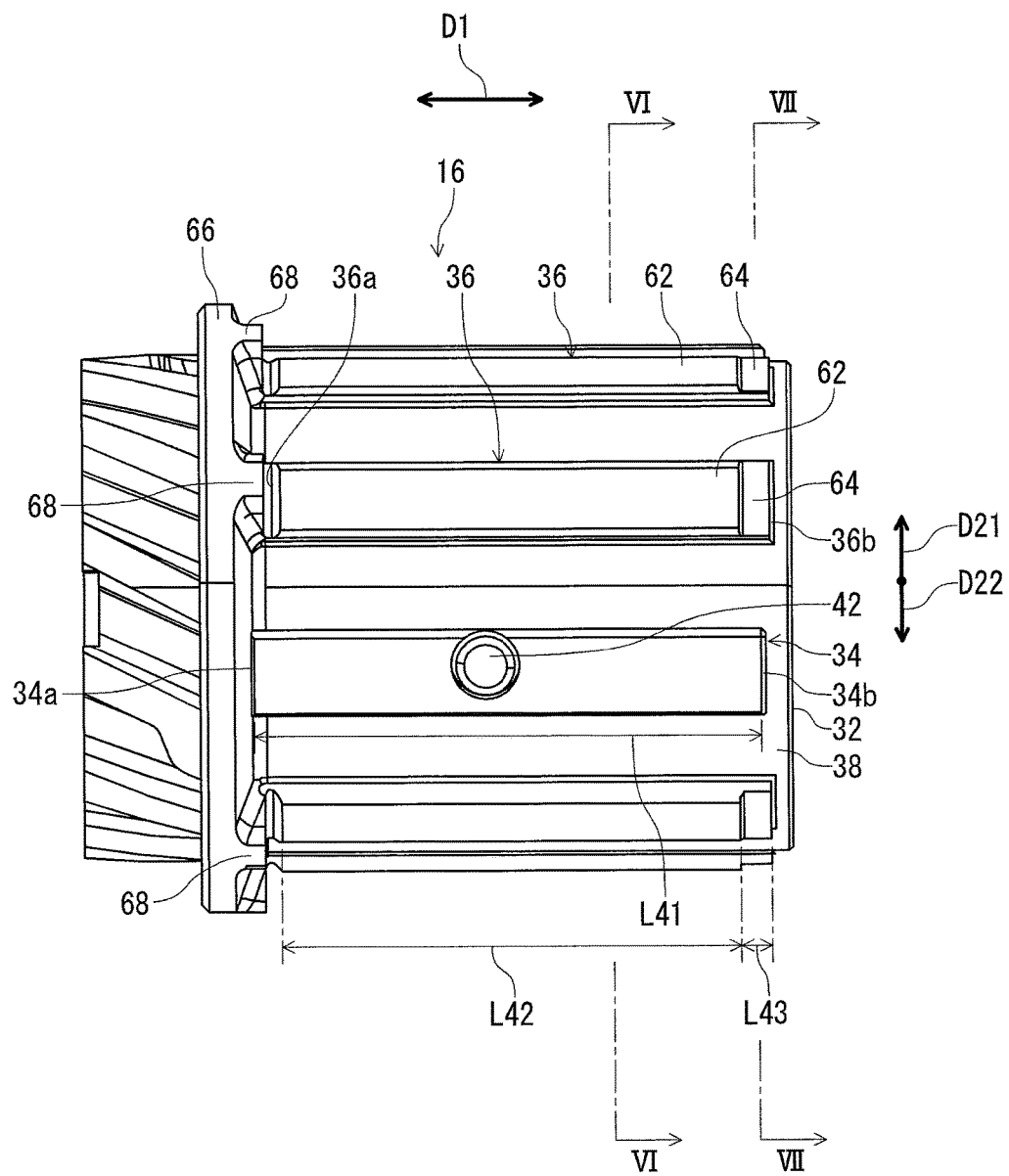
FIG. 8 is a top view of the sprocket support body illustrated in FIG. 3.

As seen in FIGS. 3 and 8, the sprocket support body 16 includes a flange part 66 extending radially outward from the outer peripheral surface 38 of the tubular part 32. As seen in FIG. 8, the second sprocket engaging tooth 36 includes a first axial end 36a and a second axial end 36b opposite to the first axial end 36a. The first axial end 36a is closer to the flange part 66 than the second axial end 36b. The second radially outer surface 62 is provided closer to the first axial end 36a than the second axial end 36b. The third radially outer surface 64 is provided closer to the second axial end 36b than the first axial end 36a. The third radially outer surface 64 is provided at the second axial end 36b and extends from the second axial end 36b toward the first axial end 36a.

As seen in FIG. 8, the first radially outer surface 58 has a first axial length L41 defined in the axial direction D1. The second radially outer surface 62 has a second axial length L42 defined in the axial direction D1. The third radially outer surface 64 has a third axial length L43 defined in the axial direction D1. The second axial length L42 is shorter than the first axial length L41. The third axial length L43 is shorter than the second axial length L42.

The first sprocket engaging tooth 34 has a first axial end 34a and a second axial end 34b opposite to the first axial end 34a of the first sprocket engaging tooth 34. The first axial end 34a is provided closer to the flange part 66 than the second axial end 34b. The second axial end 34b of the first sprocket engaging tooth 34 is provided closer to the flange part 66 than the second axial end 36b of the second sprocket engaging tooth 36 in the axial direction D1.

As seen in FIG. 8, the sprocket support body 16 includes positioning parts 68 provided on the flange part 66 to be in contact with the sprocket assembly 2 (FIG. 2) in the axial direction D1. The positioning parts 68 respectively correspond to the second sprocket engaging teeth 36. The positioning part 68 is provided at the second axial end 36b of the second sprocket engaging tooth 36. While the positioning parts 68 are not provided at positions corresponding to the first sprocket engaging teeth 34 in the illustrated embodiment, at least one positioning part can be provided at the position corresponding to the first sprocket engaging tooth 34 if needed and/or desired.

Figure 9:
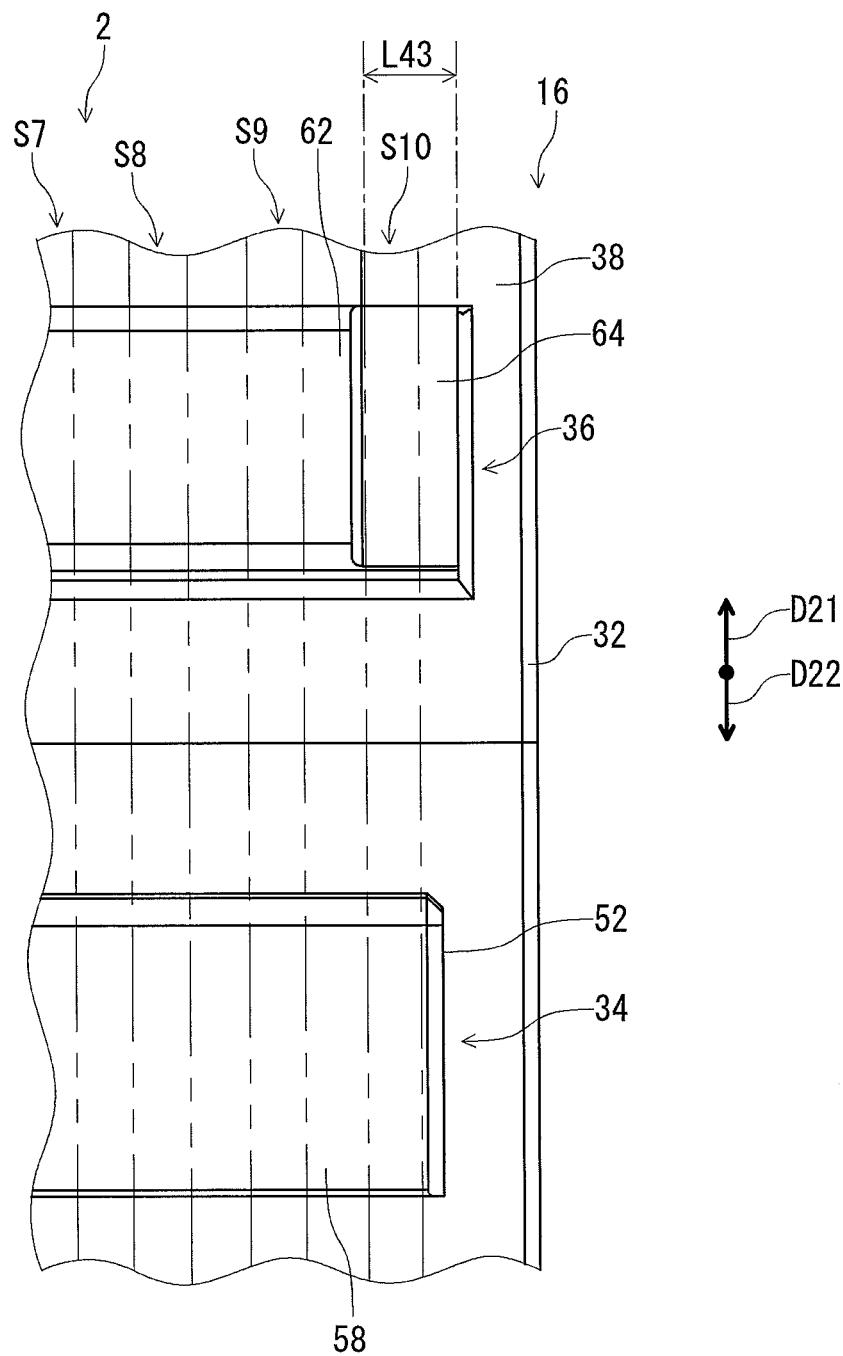
FIG. 9 is an enlarged partial top view of the sprocket support body illustrated in FIG. 3.

As seen in FIG. 9, the third radially outer surface 64 is disposed at an axial position corresponding to the sprocket S10 of the sprocket assembly 2. The sprocket S10 is top gear and has a smallest number of teeth in the sprocket assembly 2. The third axial length L43 is longer than an axial width of the sprocket S10.

Figure 10:
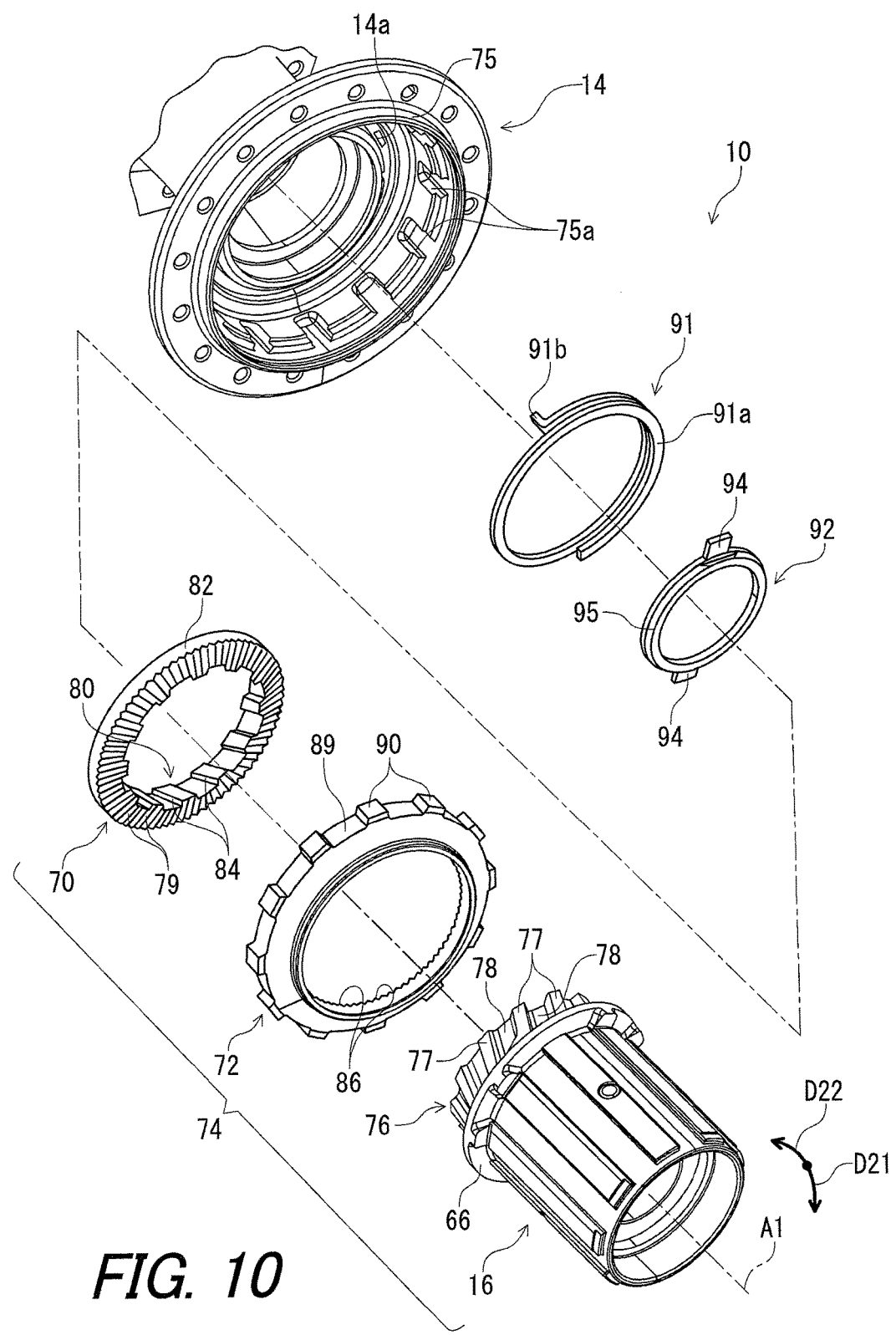
FIG. 10 is an exploded partial perspective view of the bicycle hub assembly illustrated in FIG. 1.

As seen in FIG. 10, the bicycle hub assembly 10 comprises a first ratchet member 70 and a second ratchet member 72. The first ratchet member 70 is rotatable together with the sprocket support body 16 relative to the hub shell 14 about the rotational axis A1. The second ratchet member 72 is rotatable together with the hub shell 14 relative to the sprocket support body 16 about the rotational axis A1. The sprocket support body 16, the first ratchet member 70, and the second ratchet member 72 provide a bicycle freewheel 74.

The bicycle freewheel 74 is configured to prevent the sprocket support body 16 from rotating relative to the hub shell 14 in a driving rotational direction D21 so that a pedaling force is transmitted from the sprocket support body 16 to the hub shell 14 during pedaling. The bicycle freewheel 74 is configured to allow the hub shell 14 to rotate relative to the sprocket support body 16 in the driving rotational direction D21 so that a rotational force is not transmitted from the hub shell 14 to the sprocket support body 16 during coasting (also called freewheeling). The driving rotational direction D21 is a direction in which the sprocket support body 16 rotates relative to a bicycle frame (not shown) during pedaling.

The hub shell 14 includes a freewheel housing 75 having an annular shape. The freewheel housing 75 extends in the axial direction D1. The first ratchet member 70 and the second ratchet member 72 are provided in the freewheel housing 75. The second ratchet member 72 is provided between the first ratchet member 70 and the flange part 66 of the sprocket support member 16 in the axial direction D1. The flange part 66 is contactable with the second ratchet member 72 to restrict axial movement of the second ratchet member 72 away from the hub shell 14. Coasting or freewheeling occurs when the sprocket support body 16 stops rotating relative to the bicycle frame (not shown) in an opposite rotational direction D22 while the hub shell 14 rotates relative to the bicycle frame (not shown) in the driving rotational direction D21.

As seen in FIG. 10, the sprocket support body 16 includes a first helical spline 76. The first helical spline 76 includes first spline teeth 77 and first spline grooves 78 defined between adjacent two teeth of the first spline teeth 77. The first ratchet member 70 includes at least one first ratchet tooth 79 and a second helical spline 80 configured to mate with the first helical spline 76. The first ratchet member 70 and the second ratchet member 72 are provided radially outward of the first helical spline 76 of the sprocket support body 16.

In the illustrated embodiment, the first ratchet member 70 includes a first ratchet body 82 and a plurality of first ratchet teeth 79. The first ratchet body 82 has an annular shape. The first ratchet teeth 79 are provided on an axial side of the first ratchet body 82 and are arranged in a circumferential direction defined about the rotational axis A1. The first ratchet teeth 79 radially extend relative to the rotational axis A1. The first ratchet teeth 79 provide a serration on the axial side of the first ratchet body 82. The second helical spline 80 is provided on an inner periphery of the first ratchet body 82. The second helical spline 80 includes second spline teeth 84. The second spline teeth 84 are provided on the inner periphery of the first ratchet body 82.

Figure 11:
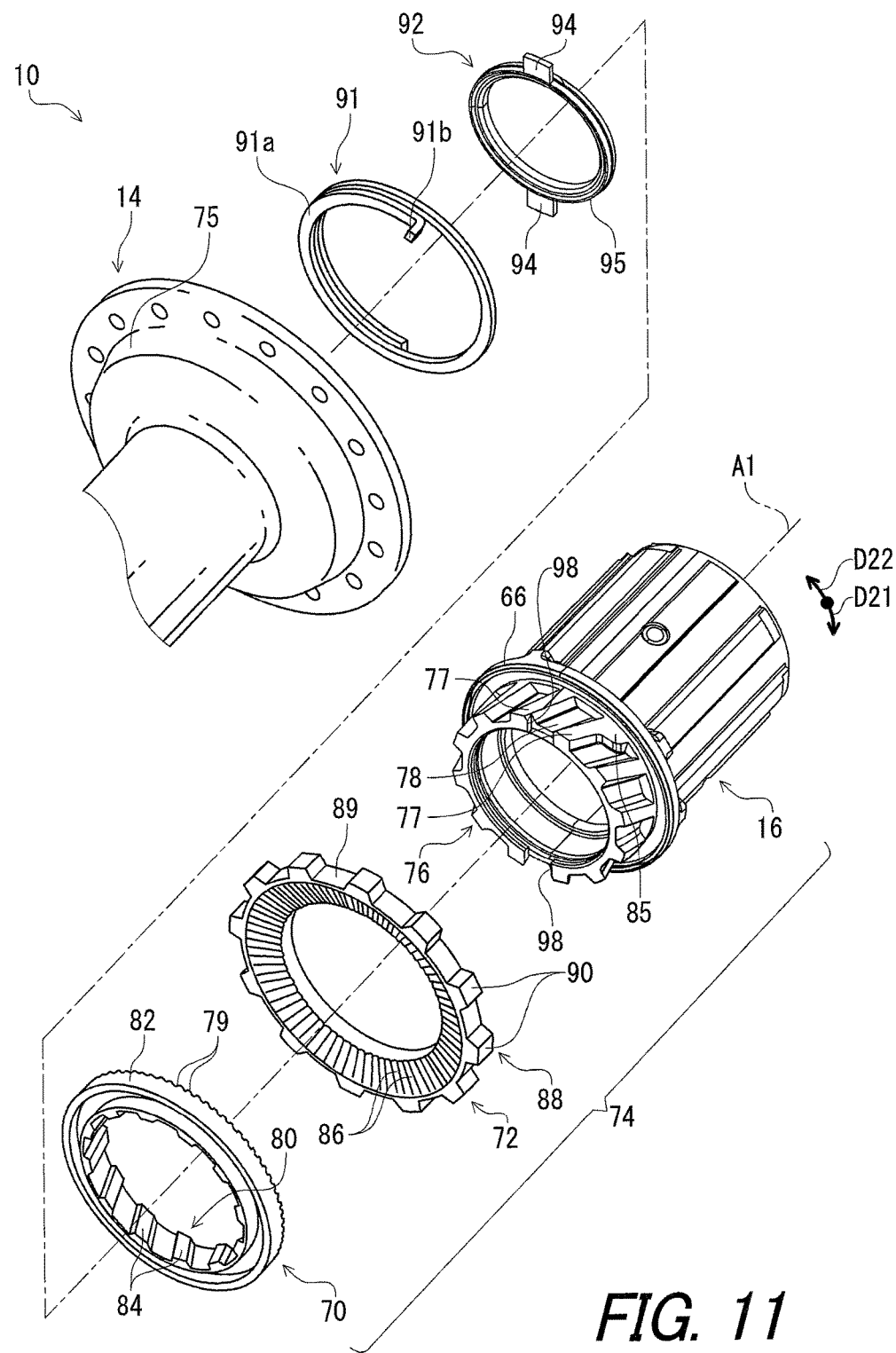
FIG. 11 is an exploded partial perspective view of the bicycle hub assembly illustrated in FIG. 1.

As seen in FIG. 11, the sprocket support body 16 includes guiding portions 85. Only one of the guiding portions 85 is illustrated in FIG. 11. The guiding portions 85 are configured to guide the first ratchet member 70 toward the hub shell 14 during coasting or freewheeling. The guiding portions 85 are configured to move the first ratchet member 70 away from the second ratchet member 72 in the axial direction D1. The guiding portion 85 extends from one of the first ratchet teeth 79 in at least a circumferential direction with respect to the rotational axis A1. While the guiding portion 85 is integral with the first spline teeth 77 in the illustrated embodiment, the guiding portion 85 can be a separate member from the first spline teeth 77 if needed and/or desired.

As seen in FIG. 11, the second ratchet member 72 includes at least one second ratchet tooth 86 and a hub shell engagement portion 88. The at least one second ratchet tooth 86 is configured to mate with the at least one first ratchet tooth 79. The hub shell engagement portion 88 is configured to engage with the hub shell 14.

In the illustrated embodiment, the second ratchet member 72 includes a second ratchet body 89 and a plurality of second ratchet teeth 86. The second ratchet teeth 86 are configured to mate with the first ratchet teeth 79 of the first ratchet member 70. The second ratchet body 89 has an annular shape. The second ratchet teeth 86 are provided on an axial side of the second ratchet body 89 and are arranged in the circumferential direction. The second ratchet teeth 86 radially extend relative to the rotational axis A1. The second ratchet teeth 86 provide a serration on the axial side of the second ratchet body 89. The hub shell engagement portion 88 includes outer teeth 90 is provided on an outer periphery of the second ratchet body 89.

As seen in FIG. 10, the freewheel housing 75 of the hub shell 14 includes recesses 75a. The recessed 75a are circumferentially arranged. The outer teeth 90 of the hub shell engaging portion 88 are provided in the recessed 75a so that the second ratchet member 72 is rotatable together with the hub shell 14 about the rotational axis A1.

The bicycle hub assembly 10 comprises a biasing member 91. The biasing member 91 is disposed between the hub shell 14 and the first ratchet member 70. The biasing member 91 is compressed between the hub shell 14 and the first ratchet member 70 in the axial direction D1. The biasing member 91 is configured to bias the first ratchet member 70 toward the second ratchet member 72. The biasing force from the biasing member 91 maintains an engagement state where the first ratchet member 70 and the second ratchet member 72 are engaged with each other via the first ratchet teeth 79 and the second ratchet teeth 86.

In the illustrated embodiment, for example, the biasing member 91 is a compression spring. Preferably, the biasing member 91 is configured to rotate with the hub shell 14. The biasing member 91 includes a coiled body 91a and a connecting end 91b. The hub shell 14 includes a connecting hole 14a. The connecting end 91b is provided in the connecting hole 14a so that the biasing member 91 rotates together with the hub shell 14.

Figure 12:
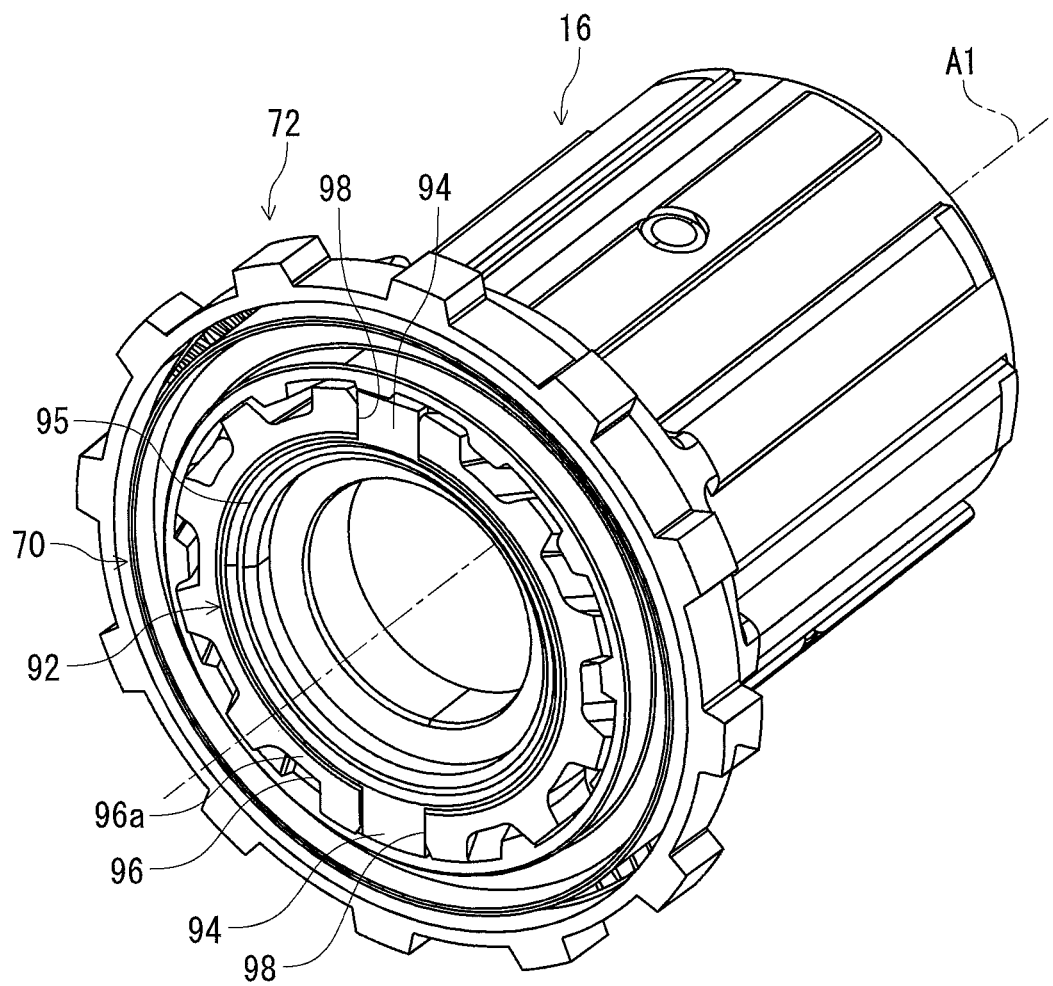
FIG. 12 is a perspective view of a bicycle freewheel of the bicycle hub assembly illustrated in FIG. 1.

As seen in FIG. 11, the bicycle hub assembly 10 comprises a holding member 92. As seen in FIG. 12, the holding member 92 is configured to hold an assembled state where the sprocket support body 16, the first ratchet member 70 and the second ratchet member 72 are assembled as a single unit. The holding member 92 is attached to the sprocket support body 16 to hold the assembled state. The holding member 92 is attached to the sprocket support body 16 to prevent the first ratchet member 70 from being removed from the sprocket support body 16.

The holding member 92 includes a restricting part 94 configured to restrict an axial movement of the first ratchet member 70 relative to the sprocket support body 16 in an attachment state where the holding member 92 is attached to the sprocket support body 16. In the illustrated embodiment, the holding member 92 includes a pair of restricting parts 94 configured to restrict the axial movement of the first ratchet member 70 relative to the sprocket support body 16 in the attachment state. One of the restricting parts 94 is opposite to the other of the restricting parts 94 relative to the rotational axis A1. A total number of the restricting part 94 is not limited to the illustrated embodiment.

As seen in FIG. 12, the holding member 92 includes an attachment part 95 configured to be attached to the sprocket support body 16. The restricting part 94 extends outward from the attachment part 95 in the radial direction of the bicycle hub assembly 10. The attachment part 95 has an annular shape. The restricting part 94 extends outward from an outer periphery of the attachment part 95 in the radial direction.

Figure 13:
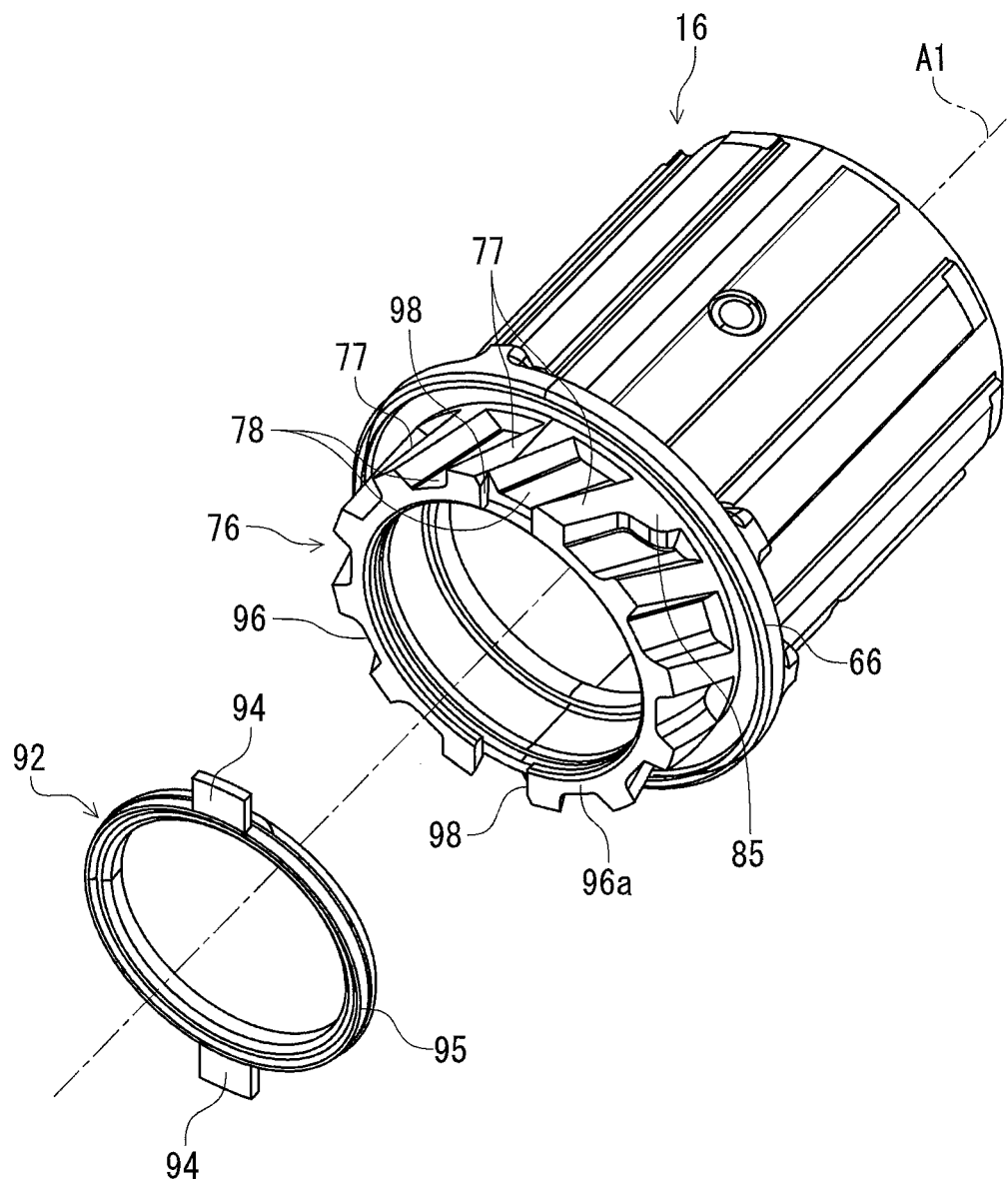
FIG. 13 is an exploded perspective view of the sprocket support body and a holding member of the bicycle hub assembly illustrated in FIG. 1.

As seen in FIG. 13, the sprocket support body 16 includes an annular part 96. The first helical spline 76 is provided on an outer periphery of the annular part 96. The attachment part 95 is configured to be attached to the annular part 96 of the sprocket support body 16. The attachment part 95 is configured to be attached to an end of the annular part 96.

The sprocket support body 16 includes an attachment groove 98 provided on an axial end surface 96a of the annular part 96.

In the illustrated embodiment, the sprocket support body 16 includes a pair of attachment grooves 98 provided on the axial end surface 96a of the annular part 96. One of the attachment grooves 98 is opposite to the other of the attachment grooves 98 relative to the rotational axis A1. The attachment groove 98 extends in the radial direction. As seen in FIG. 12, the restricting part 94 is at least partially provided in the attachment groove 98 in an attachment state where the holding member 92 is attached to the sprocket support body 16.

Figure 14:
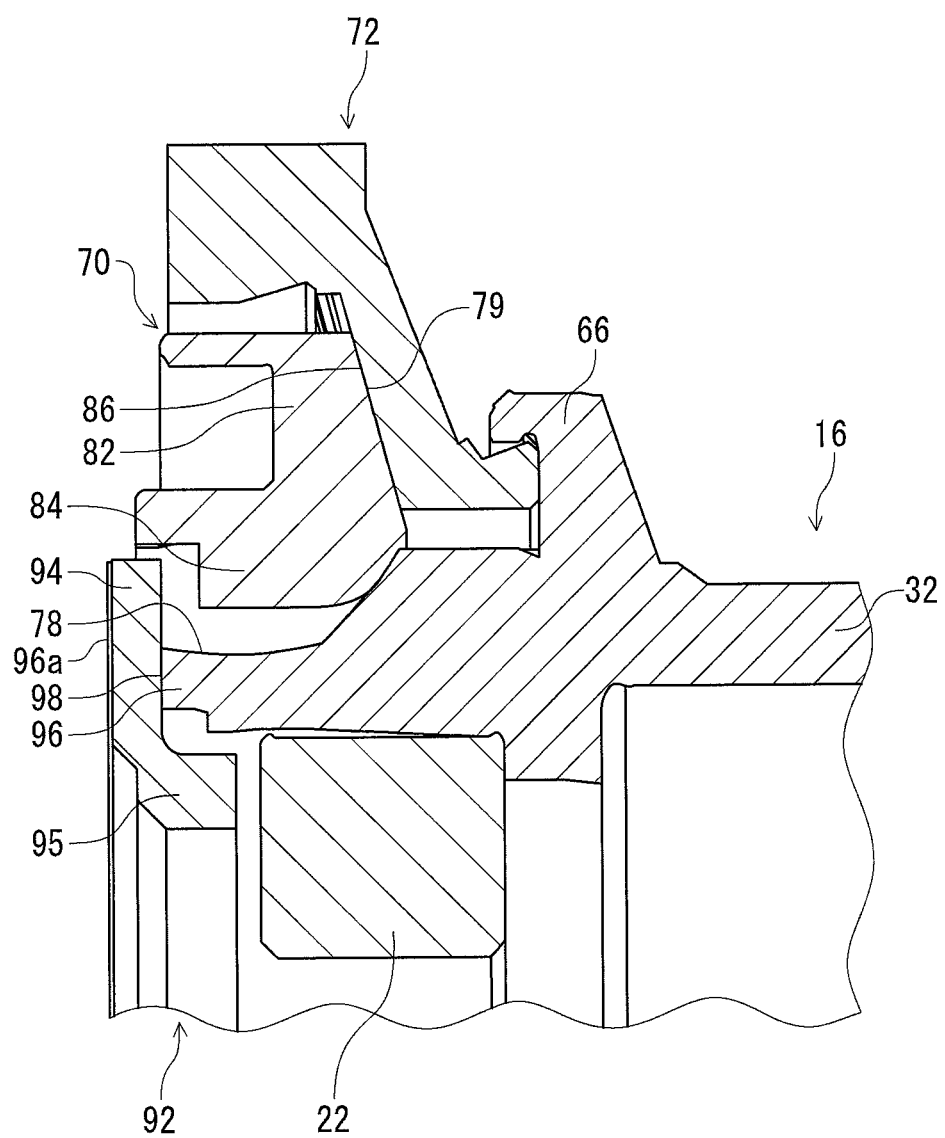
FIG. 14 is a partial cross-sectional view of bicycle hub assembly illustrated in FIG. 1.

As seen in FIG. 14, the holding member 92 is disposed at an axial position where the holding member 92 does not protrude from the axial end surface 96a of the annular part 96 in the attachment state. The restricting part 94 is contactable with the first ratchet member 70 to restrict the axial movement of the first ratchet member 70 relative to the sprocket support body 16 in the attachment state. The restricting part 94 is contactable with at least one of the second spline teeth 84 to restrict an axial movement of the first ratchet member 70 relative to the sprocket support body 16 in the attachment state where the holding member 92 is attached to the sprocket support body 16.

Figure 15:
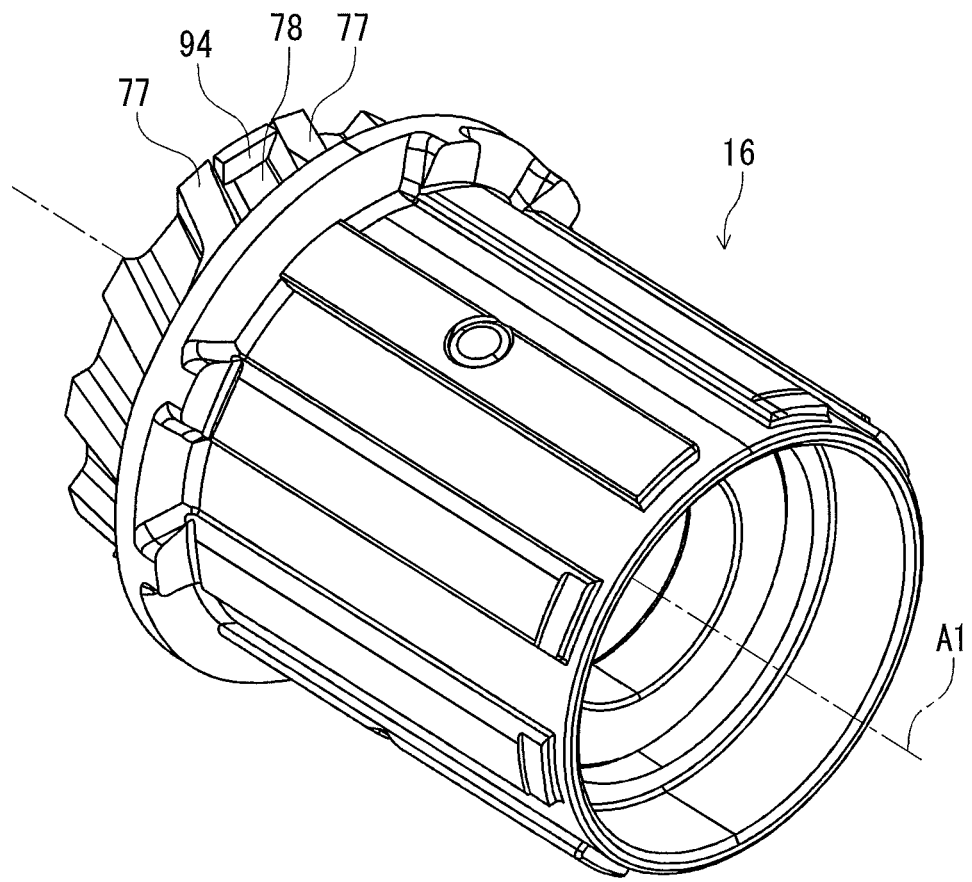
FIG. 15 is a perspective view of the sprocket support body and the holding member illustrated in FIG. 11.

As seen in FIG. 15, the restricting part 94 is provided at an axial end of at least one of the first spline grooves 78. While each of the restricting parts 94 is provided at an axial end of one of the first spline grooves 78 in the illustrated embodiment, the restricting part 94 can be provided at axial ends of more than two of the first spline grooves 78 if needed and/or desired.

Figure 16:
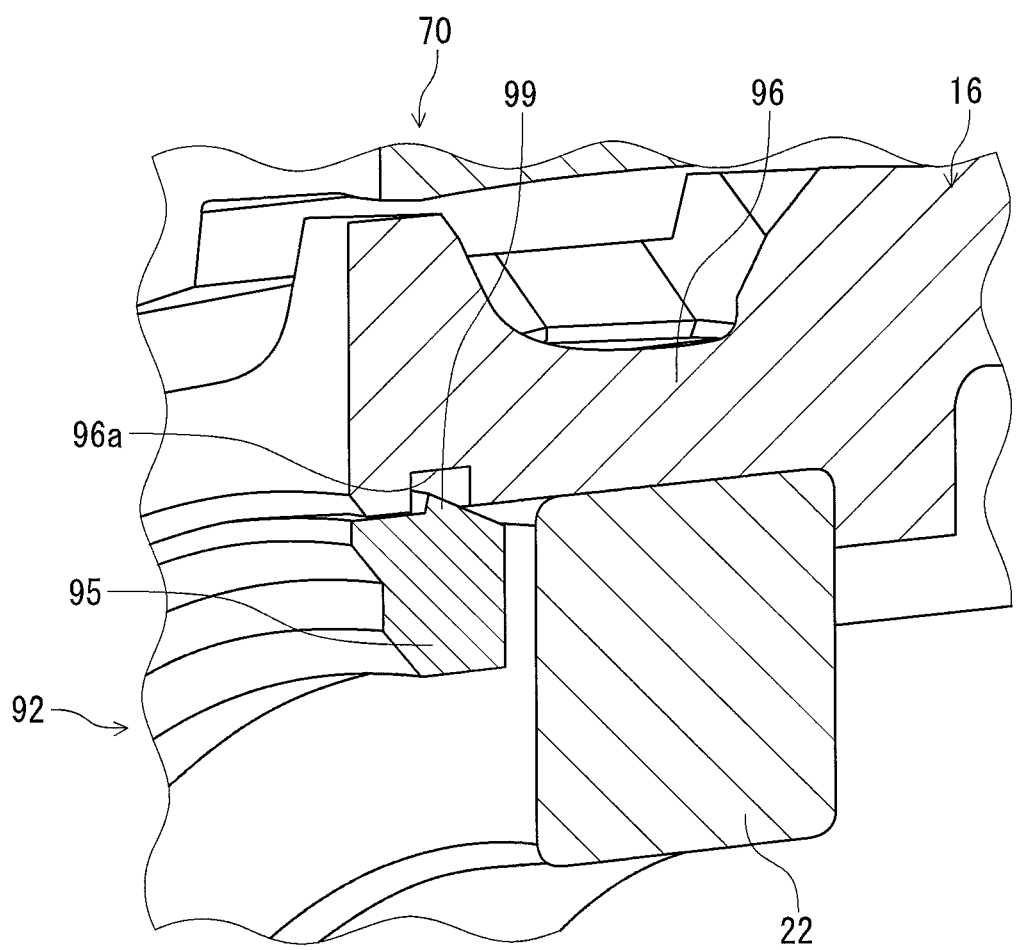
FIG. 16 is a partial cross-sectional view of the bicycle hub assembly illustrated in FIG. 1.

As seen in FIG. 16, the attachment part 95 includes a protruding portion 99. The annular part 96 of the sprocket support body 16 includes a groove 96a. The protruding portion 99 is provided in the groove 96a so that the holding member 92 is fixedly attached to the sprocket support body 16.

Figure 17:
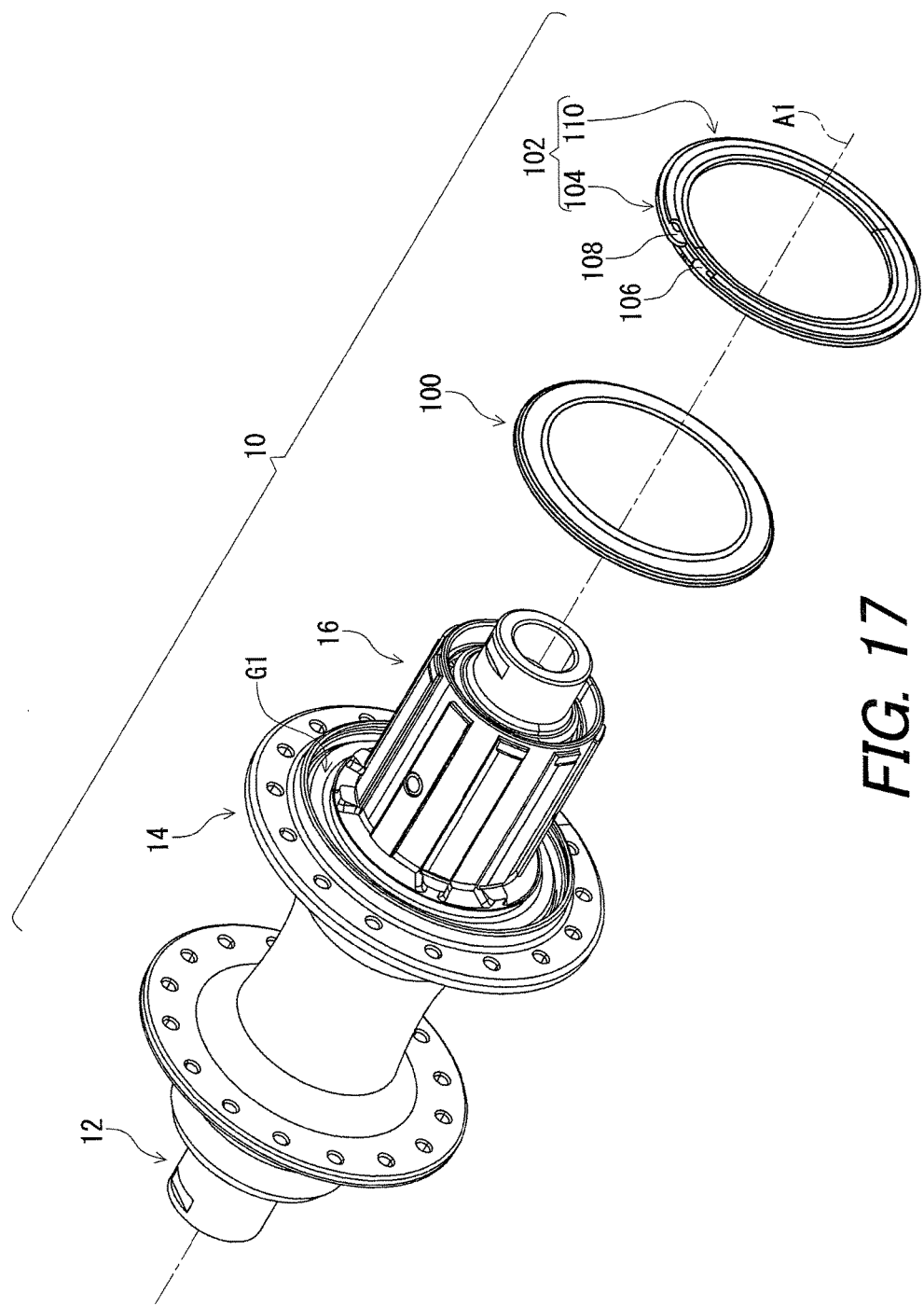
FIG. 17 is an exploded perspective view of the bicycle hub assembly illustrated in FIG. 1.

As seen in FIG. 17, the bicycle hub assembly 10 further comprises a cover member 100 and an additional holding member 102. The cover member 100 is configured to cover an annular gap G1 between the sprocket support body 16 and the hub shell 14. The additional holding member 102 is configured to be detachably attached to the hub shell 14 to hold a cover state where the cover member 100 covers the annular gap G1.

As seen in FIG. 17, the additional holding member 102 includes a first member 104 elastically deformable so that an outer diameter of the first member 104 changes. The first member 104 has a substantially annular shape and includes a first end 106 and a second end 108 circumferentially opposite to the first end 106 with a gap between the first end 106 and the second end 108. While the first member 104 is a snap ring in the illustrated embodiment, the first member 104 can be another member other than the snap ring if needed and/or desired. When the first end 106 and the second end 108 approach each other, the first member 104 is elastically deformed so that the outer diameter of the first member 104 decreases.

Figure 18:
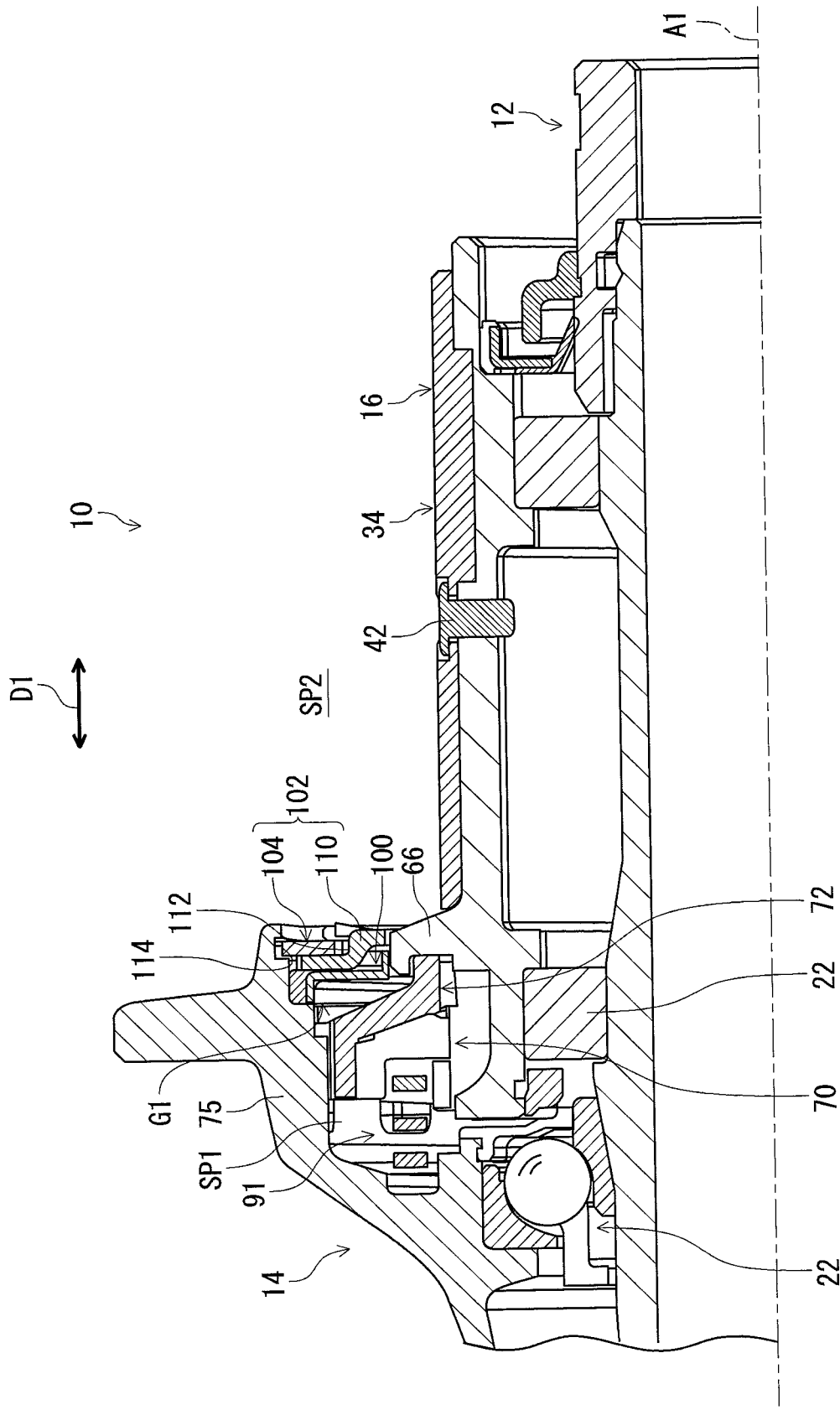
FIG. 18 is a partial cross-sectional view of the bicycle hub assembly illustrated in FIG. 1.

As seen in FIG. 18, the additional holding member 102 includes a second member 110 including an annular groove 112 in which the first member 104 is provided. The first member 104 is elastically deformable in the annular groove 112 of the second member 110. The freewheel housing 75 of the hub shell 14 includes an inner groove 114 in which the additional holding member 102 is fitted.

As seen in FIG. 18, the cover member 100 is configured to cover the annular gap G1 between the flange part 66 of the sprocket support body 16 and the freewheel housing 75 of the hub shell 14. An inside space SP1 is sealed from an outside space SP2 of the bicycle hub assembly 10 with the cover member 100. The first ratchet member 70 and the second ratchet member 72 are provided in the inside space SP1.

As seen in FIG. 17, when the sprocket support body 16 is detached from the hub axle 12, the additional holding member 102 is detached from the hub shell 14. More specifically, the first member 104 is elastically deformed so that the outer diameter of the first member 104 decreases. Thus, the first member 104 and the cover member 100 are detached from the hub shell 14.

Figure 19:
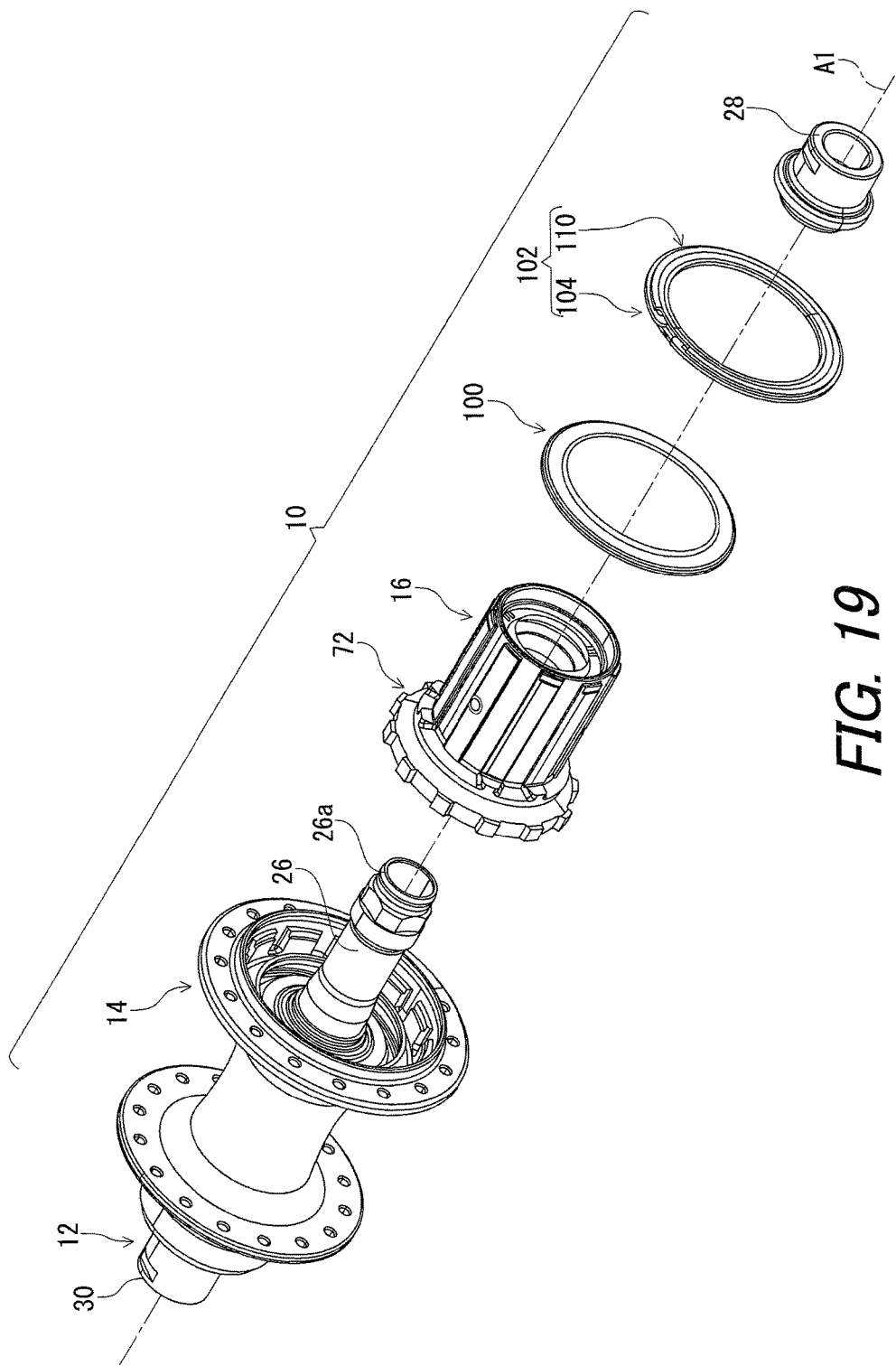
FIG. 19 is an exploded perspective view of the bicycle hub assembly illustrated in FIG. 1.

As seen in FIG. 19, the first end cap 28 is detached from the axle body 26, allowing the sprocket support body 16 to be detached from the hub axle 12. At this time, the sprocket support body 16, the first ratchet member 70, the second ratchet member 72, and the holding member 92 are detached from the hub axle 12 as a single unit since the holding member 92 holds the assembled state of the sprocket support body 16, the first ratchet member 70, and the second ratchet member 72 as the single unit (FIG. 12). This allows these members to be easily detached from the hub axle 12. Since opposite action can be applied to the attachment of these members to the hub axle 12, it will not be described in detail here for the sake of brevity.

With the bicycle hub assembly 10, as seen in FIG. 12, the holding member 92 is configured to hold the assembled state where the sprocket support body 16, the first ratchet member 70 and the second ratchet member 72 are assembled as the single unit. This allows the sprocket support body 16, the first ratchet member 70 and the second ratchet member 72 to be detached from the hub axle 12 as the single unit (FIG. 19). Accordingly, it is possible to improve the maintenance of the bicycle hub assembly 10.

With the bicycle hub assembly 10, as seen in FIG. 7, since the second distance L32 is shorter than the first distance L31, the second sprocket engaging tooth 36 can have a smaller circumferential surface pressed by the sprocket assembly 2 (FIG. 2) in the driving rotational direction D21 than the first sprocket engaging tooth 34. Accordingly, it is possible to reduce weight of the bicycle hub assembly 10 with keeping desired strength of the second sprocket engaging tooth 36.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hub assembly comprising:
   a hub axle defining a rotational axis;
   a hub shell rotatably mounted on the hub axle to rotate about the rotational axis;
   a sprocket support body rotatably mounted on the hub axle to rotate about the rotational axis, the sprocket support body including a first helical spline;
   a first ratchet member including
      at least one first ratchet tooth, and
      a second helical spline configured to mate with the first helical spline;
   a second ratchet member including
      at least one second ratchet tooth configured to mate with the at least one first ratchet tooth, and
      a hub shell engagement portion configured to engage with the hub shell; and
   a holding member configured to hold an assembled state where the sprocket support body, the first ratchet member and the second ratchet member are assembled as a single unit.

2. The bicycle hub assembly according to claim 1, wherein
   the holding member is attached to the sprocket support body to hold the assembled state.

3. The bicycle hub assembly according to claim 1, wherein
   the holding member is attached to the sprocket support body to prevent the first ratchet member from being removed from the sprocket support body.

4. The bicycle hub assembly according to claim 1, wherein
   the holding member includes a restricting part configured to restrict an axial movement of the first ratchet member relative to the sprocket support body in an attachment state where the holding member is attached to the sprocket support body.

5. The bicycle hub assembly according to claim 4, wherein
   the holding member includes an attachment part configured to be attached to the sprocket support body, and
   the restricting part extends outward from the attachment part in a radial direction of the bicycle hub assembly.

6. The bicycle hub assembly according to claim 5, wherein
   the attachment part has an annular shape, and
   the restricting part extends outward from an outer periphery of the attachment part in the radial direction.

7. The bicycle hub assembly according to claim 5, wherein
   he sprocket support body includes an annular part,
   the first helical spline is provided on an outer periphery of the annular part, and
   the attachment part is configured to be attached to the annular part of the sprocket support body.

8. The bicycle hub assembly according to claim 7, wherein
the attachment part is configured to be attached to an end of the annular part.

9. The bicycle hub assembly according to claim 7, wherein
the sprocket support body includes an attachment groove provided on an axial end surface of the annular part, and
the restricting part is at least partially provided in the attachment groove in an attachment state where the holding member is attached to the sprocket support body.

10. The bicycle hub assembly according to claim 9, wherein
the holding member is disposed at an axial position where the holding member does not protrude from the axial end surface of the annular part in the attachment state.

11. The bicycle hub assembly according to claim 9, wherein the attachment groove extends in the radial direction.

12. The bicycle hub assembly according to claim 4, wherein
the restricting part is contactable with the first ratchet member to restrict the axial movement of the first ratchet member relative to the sprocket support body in the attachment state.

13. The bicycle hub assembly according to claim 4, wherein
the second helical spline includes second spline teeth, and
the restricting part is contactable with at least one of the second spline teeth to restrict an axial movement of the first ratchet member relative to the sprocket support body in the attachment state where the holding member is attached to the sprocket support body.

14. The bicycle hub assembly according to claim 4, wherein
the first helical spline includes
first spline teeth, and
first spline grooves defined between adjacent two teeth of the first spline teeth, and
the restricting part is provided at an axial end of at least one of the first spline grooves.

15. The bicycle hub assembly according to claim 1, further comprising:
a cover member configured to cover an annular gap between the sprocket support body and the hub shell; and
an additional holding member configured to be detachably attached to the hub shell to hold a cover state where the cover member covers the annular gap.

16. The bicycle hub assembly according to claim 15, wherein
the additional holding member includes a first member elastically deformable so that an outer diameter of the first member changes.

17. The bicycle hub assembly according to claim 16, wherein
the first member has a substantially annular shape and includes
a first end, and
a second end circumferentially opposite to the first end with a gap between the first end and the second end.

18. The bicycle hub assembly according to claim 17, wherein
the additional holding member includes a second member including an annular groove in which the first member is provided.

* * * * *